United States Patent [19]

Schur et al.

[11] Patent Number: 4,971,807

[45] Date of Patent: Nov. 20, 1990

[54] PROCESS FOR THE PRODUCTION OF BEER WITH A LOW ALCOHOL CONTENT

[75] Inventors: Fritz Schur, Magden; Peter Sauer, Männedorf, both of Switzerland

[73] Assignee: Brauerei Feldschlosschen, Rheinfelden, Switzerland

[21] Appl. No.: 387,651

[22] Filed: Jul. 31, 1989

[51] Int. Cl.$^5$ .......................... C12C 7/00; C12C 11/04
[52] U.S. Cl. ........................................ 426/16; 426/29; 426/14; 426/592; 426/600; 426/330.4
[58] Field of Search ....................... 426/11, 14, 16, 29, 426/61, 62, 592, 600, 330.4

[56] References Cited

U.S. PATENT DOCUMENTS 4,661,355 4/1987 Schur ..................................... 426/14
4,746,518 5/1988 Schur ..................................... 426/15

FOREIGN PATENT DOCUMENTS 2085027 4/1982 United Kingdom .
2112619 7/1983 United Kingdom .
2111555 7/1986 United Kingdom .

OTHER PUBLICATIONS

Journal of the Institute of Brewing, May–Jun. 1985, T. Takahashi et al. "Examination of the Brewing Industry".

Primary Examiner—Marianne Cintins
Attorney, Agent, or Firm—Poms, Smith, Lande & Rose

[57] ABSTRACT

A process for the production of beer with a low alcohol content is described. The process comprises preparing a wort by boiling and adding ascorbic acid to such wort prior, during, or after boiling, so long as the wort remains hot. The process can be employed according to the invention for the production of non-alcoholic beer by the yeast cold contact process, in which yeast recovered from a fermentation process is brought into contact with the wort at a low temperature below 0° C. As a rule, the non-alcoholic beer produced by this process imparts an unpleasant and bitter aftertaste. By adding ascorbic acid to the boiling wort, the bitter aftertaste is completely eliminated.

6 Claims, No Drawings

PROCESS FOR THE PRODUCTION OF BEER WITH A LOW ALCOHOL CONTENT

BACKGROUND OF THE INVENTION

1. Field of Invention

The present invention relates to a process for the production of beer with a low alcohol content, in which a wort is prepared by boiling.

2. Description of Prior Art

DE-A No. 32 13 056.2 describes a process of the above mentioned type in which yeast recovered from a fermentation process is brought into contact at a low temperature, below 0° C., with a wort prepared beforehand by boiling. Even though the wort and yeast remain in contact, alcohol formation does not take place at all at such a low temperature. Cold contact with the yeast changes the flavor of the wort to that of beer. Although the prior art process produces good results, the finished low-alcohol product possesses a certain unpleasant and bitter aftertaste.

SUMMARY OF THE INVENTION

It is a particular object of the present invention to provide a process that will help eliminate the unpleasant bitter aftertaste in alcohol-free beer, and produce a beverage having a pleasant and agreeable flavor.

According to the present invention, the above object will be achieved by means of a process for the production of beer with a low alcohol content, in which a wort is prepared by boiling, wherein ascorbic acid is added to the wort before, during, or after boiling, so long as the wort remains hot.

DESCRIPTION OF PREFERRED EMBODIMENTS

In accordance with a preferred embodiment of the invention, ascorbic acid is added to the wort under atmospheric pressure at least 15 minutes prior to the end of boiling. It may also be added to the wort shortly before the wort starts to boil.

In accordance with another preferred embodiment of the invention, ascorbic acid is added to the wort after boiling the wort, and the temperature of the wort is maintained above 80° C. for at least 30 minutes after ascorbic acid has been added.

In accordance with yet another embodiment, ascorbic acid is added to a concentration of between 1 and 100 ppm with respect to the wort, the concentration being based on the finished product, preferably 20 ppm.

In accordance with yet another embodiment of the invention, a wort having a low oxygen content is used.

According to the process of the invention, ascorbic acid is added to the wort before, during, or after boiling, so long as the wort remains hot. The addition of ascorbic acid to the hot wort permits a practically complete elimination of the unacceptable aftertaste.

Investigations have shown that the bitter substances produced by oxidation during malt roasting are responsible for the bitter aftertaste. Such substances are also present in beer of normal alcohol content; however, their effect on the taste of the beer is, to a large extent, masked by the presence of alcohol. The advantage offered by the present invention is most likely due to the reduction of the bitter substances as a result of an adequate quantity of added ascorbic acid. Higher temperatures obtained by boiling have a decisive effect on the completion of the reduction process. The conventional and usual method of adding ascorbic acid as an antioxidant to the cold wort after boiling or especially to the finished product, in order to increase its shelf life, does not achieve the object of the present invention. Analytical results show that a considerable proportion of the ascorbic acid is consumed during the boiling process and is thus no longer available to serve as an antioxidant in the finished product.

The wort is normally boiled for 1-2 hours at atmospheric pressure. Preferably, however, the wort is heated to boiling temperature and ascorbic acid is added at the start of the boiling phase. Depending on the severity of the bitter aftertaste that must be eliminated, the object of the invention can be achieved by first adding ascorbic acid during the end phase of the boiling process, e.g., about 15 minutes before boiling stops. Whenever the wort remains or is kept hot for a sufficient length of time after boiling (e.g., above 80° C. for at least half an hour), it is sufficient to add ascorbic acid to the wort only after boiling is terminated. Accordingly, it is to a large extent irrelevant to the object of the invention whether the wort is boiled at 100° C. under atmospheric pressure, at low pressure at, e.g., 80° C., or at an excess pressure at, e.g., 120° C. The reaction time of the ascorbic acid decreases as wort temperature increases. The temperature of the wort should not, however, fall below about 80° C. during the reaction with ascorbic acid. At a wort temperature below approximately 85° C., the reaction period should last at least about half an hour.

Accomplishment of the object of the present invention requires the addition of ascorbic acid at a concentration of between 1 and 100 ppm based on the finished product and depending on the original wort used. A stock wort of e.g., 7 wt-% requires the use of approximately 20 ppm ascorbic acid.

It has also proven advantageous to use a wort having an oxygen content which is as low as possible.

The process according to the invention is especially suited for use in conjunction with the production of practically non-alcoholic beer according to the method involving cold contact with yeast and thus considerably improved the flavor of non-alcoholic beer. The proposed process can also be used advantageously in the production of beer of normal alcohol content.

The embodiments of the invention in which an exclusive property of privilege is claimed are defined as follows:

1. A process for the production of beer having a low alcohol content comprising the steps of:
    preparing a wort by mixing a predetermined amount of a malt with a predetermined amount of water thereby forming a wort;
    boiling said wort;
    adding a predetermined amount of ascorbic acid to said boiling wort, said amount being effective to reduce bitter substances in the wort;
    cooling said wort;
    adding yeast to said cooled wort; and
    removing said yeast from said wort after the flavor of said wort has been changed by the yeast from the flavor of wort to that of beer.

2. In a process for producing beer having a low alcohol content including the steps of adding water to malt to form a wort, boiling said wort, cooling said wort after boiling, adding yeast to said cooled wort and allowing said cooled wort containing said yeast to rest until the flavor of said wort changes to that of beer, the improvement which comprises:

adding a predetermined amount of ascorbic acid to said wort while boiling the same, said amount being effective to reduce bitter substances in them.

3. In the process of claim 2 wherein the ascorbic acid is added under atmospheric pressure at least 15 minutes prior to the end of boiling.

4. In the process of claim 2, wherein the ascorbic acid is added to said wort when the wort starts to boil.

5. In the process of claim 2 or 4 wherein the ascorbic acid is added at a concentration of between 1 and 100 ppm ascorbic acid to said wort, said concentration depending on the amount of beer to be produced and the concentration of original wort therein.

6. In the process of claim 5 wherein the ascorbic acid is added at a concentration of 20 ppm ascorbic acid to said wort.

* * * * *